US007269502B2

(12) United States Patent
Zhang et al.

(10) Patent No.: US 7,269,502 B2
(45) Date of Patent: Sep. 11, 2007

(54) MOBILE EVENT TRIGGERING FUNCTION FOR TRANSIT MANAGEMENT SYSTEM USING TRAFFIC SIGNAL PRIORITY

(75) Inventors: Kee Zhang, Hiawatha, IA (US); Timothy V. McLaren, Marion, IA (US)

(73) Assignee: Siemens VDO Automotive Corporation, Auburn Hills ( * ) Notice: Subject to any disclaimer, the term of this patent is extended or adjusted under 35 U.S.C. 154(b) by 678 days.

(21) Appl. No.: 10/758,901

(22) Filed: Jan. 16, 2004

(65) Prior Publication Data

US 2004/0147291 A1 Jul. 29, 2004

Related U.S. Application Data

(60) Provisional application No. 60/524,153, filed on Nov. 21, 2003, provisional application No. 60/440,684, filed on Jan. 17, 2003.

(51) Int. Cl.
*G06F 19/00* (2006.01)
*G06G 7/70* (2006.01)

(52) U.S. Cl. ........................ 701/117; 701/118; 340/907

(58) Field of Classification Search ........ 701/117–119; 340/901–902, 907; 455/152.1, 344, 569.2
See application file for complete search history.

(56) References Cited

U.S. PATENT DOCUMENTS 5,602,739 A * 2/1997 Haagenstad et al. ........ 701/117
6,182,009 B1 1/2001 Brocke et al. .............. 701/209
6,243,026 B1 6/2001 Judge et al. ................ 340/906

FOREIGN PATENT DOCUMENTS

DE 19944310 3/2001

* cited by examiner

*Primary Examiner*—Gertrude A. Jeanglaude

(57) ABSTRACT

A traffic signal control method and system reduces the delay time of a transit vehicle at an intersection by incorporating an automatic vehicle location (AVL) system to trigger a traffic signal priority (TSP) strategy with a chain of mobile events to determine the correct timing, location, conditions, and/or other mobile events that may trigger a TSP action. The traffic signal control can also be used to notify vehicle status in passenger/traveler information systems such as street signs, to monitor the wait time at an intersection or bus stop, and in any application that relates to vehicle entry into a given location and a consequence of actions that may be associated with the location.

1 Claim, 8 Drawing Sheets

| | 300 | 302 | 304 | 306 | 308 | 310 | 312 | 314 | 316 | 318 | 320 | 322 |
|---|---|---|---|---|---|---|---|---|---|---|---|---|
| 1 | Event ID | Event Group ID | Event Seq ID | Route ID | Route Direction ID | Time Profile ID | Enable Event | Event Type ID | Event Attribute ID | Has Next Event | Timer To Next Event | Timeout Action ID |
| 2 | 1 | 1 | 1 | 49 | 6 | 0 | 1 | 2 | 1 | 1 | 100 | 14 |
| 3 | 2 | 1 | 2 | 49 | 6 | 0 | 1 | 2 | 1 | 0 | 0 | 0 |
| 4 | 16 | 6 | 1 | 49 | 11 | 1 | 1 | 2 | 6 | 1 | 600 | 0 |
| 5 | 17 | 6 | 2 | 49 | 11 | 1 | 1 | 2 | 6 | 1 | 0 | 0 |
| 6 | 18 | 6 | 3 | 49 | 11 | 1 | 1 | 2 | 6 | 1 | 120 | 14 |
| 7 | 19 | 6 | 4 | 49 | 11 | 1 | 1 | 2 | 6 | 0 | 0 | 0 |

FIG. 6A

| | 300 | 324 | 326 | 328 | 330 | 332 | 334 | 336 |
|---|---|---|---|---|---|---|---|---|
| 1 | Event ID | Use Location Criterion | Latitude | Longitude | Buffer Distance | Approaching Heading | Heading Deviation | Criteria Combination |
| 2 | 1 | 1 | 42.33184 | -71.08182 | 200 | 32 | 20 | & |
| 3 | 2 | 1 | 42.33314 | -71.08084 | 150 | 27 | 20 | & |
| 4 | 16 | 1 | 42.33551 | -71.07822 | 200 | 203 | 20 | & |
| 5 | 17 | 1 | 42.33624 | -71.07731 | 120 | 205 | 20 | & |
| 6 | 18 | 0 | 42.33624 | -71.07731 | 120 | 205 | 20 | & |
| 7 | 19 | 1 | 42.33671 | -71.07670 | 150 | 207 | 20 | & |

FIG. 6B

| | 300 | 338 | 340 | 342 | 344 | 346 |
|---|---|---|---|---|---|---|
| 1 | Event ID | Use Adherence Criterion | Time Point ID | Timepoint Adherence Threshold | Adherence Operator | Criteria Combination |
| 2 | 1 | 1 | 1122 | -5 | < | & |
| 3 | 2 | 0 | 1122 | 0 | 0 | 0 |
| 4 | 16 | 1 | 1144 | -5 | < | & |
| 5 | 17 | 1 | 1144 | -5 | < | & |
| 6 | 18 | 1 | 1144 | -5 | < | & |
| 7 | 19 | 0 | 1144 | 0 | 0 | 0 |

FIG. 6C

| | 300 | 347 | 340a | 342a | 344 | 346 |
|---|---|---|---|---|---|---|
| 1 | Event ID | Use Passenger Count Criterion | Device ID | Passenger Count Threshold | Adherence Operator | Criteria Combination |
| 2 | 1 | 1 | 0 | 25 | > | & |
| 3 | 2 | 0 | 0 | 0 | 0 | 0 |
| 4 | 16 | 1 | 0 | 25 | > | & |
| 5 | 17 | 1 | 0 | 25 | > | & |
| 6 | 18 | 1 | 0 | 25 | > | & |
| 7 | 19 | 0 | 0 | 0 | 0 | 0 |

FIG. 6D

| | 300 | 348 | 350 | 352 | 354 | 355 |
|---|---|---|---|---|---|---|
| 1 | Event ID | Use Vehicle Status Criterion | Status Type | Status | Condition | Criteria Combination |
| 2 | 1 | 0 | 0 | 0 | 0 | 0 |
| 3 | 2 | 0 | 0 | 0 | 0 | 0 |
| 4 | 16 | 0 | 0 | 0 | 0 | 0 |
| 5 | 17 | 1 | Door | Open | TRUE | & |
| 6 | 18 | 1 | Door | Close | TRUE | & |
| 7 | 19 | 0 | 0 | 0 | 0 | 0 |

FIG. 6E

| 1 | Event ID (300) | Action ID (356) | Exit Distance (358) | Exit After Time (360) | Exit Action ID (362) |
|---|---|---|---|---|---|
| 2 | 1 | 13 | 700 | 50 | 14 |
| 3 | 2 | 14 | 0 | 0 | 0 |
| 4 | 16 | 0 | 0 | 0 | 0 |
| 5 | 17 | 0 | 0 | 0 | 0 |
| 6 | 18 | 0 | 5 | 2 | 13 |
| 7 | 19 | 14 | 0 | 0 | 0 |

FIG. 6F

| 1 | Time_Profile_ID (310) | Service_Type_ID (310A) | Start_Time_HHMM (310B) | End_Time_HHMM (310C) | Time_Profile_Desc (310D) |
|---|---|---|---|---|---|
| 2 | 1 | 1 | 700 | 900 | WeekDay Peak AM |
| 3 | 2 | 1 | 1600 | 1800 | WeekDay Peak PM |
| 4 | 3 | 2 | 900 | 1000 | Saturday Peak AM |
| 5 | 4 | 2 | 1700 | 2000 | Saturday Peak PM |
| 6 | 5 | 3 | 800 | 1000 | Sunday Peak AM |
| 7 | 6 | 7 | 630 | 830 | School Day AM |

FIG. 7

| 1 | Event Action ID | Emitter Discrete State | Comments |
|---|---|---|---|
| 2 | 100 | 00 | No TSP |
| 3 | 101 | 01 | Lowest TSP Request |
| 4 | 102 | 10 | Medium TSP Request |
| 5 | 103 | 11 | Highest TSP Request |
| 6 | 104 | Auto | Default Emiter State in Mobile Configure |

MOBILE EVENT TRIGGERING FUNCTION FOR TRANSIT MANAGEMENT SYSTEM USING TRAFFIC SIGNAL PRIORITY

REFERENCE TO RELATED APPLICATIONS

This application claims the benefit of U.S. Provisional Application No. 60/440,684 and 60/524,153, filed Jan. 17, 2003 and Nov. 21, 2003, the entirely of which is herein incorporated by reference.

TECHNICAL FIELD

The present invention relates to control over traffic signals, and more particularly to traffic signal control based on traffic conditions.

BACKGROUND OF THE INVENTION

Traffic signal priority (TSP) is an operational strategy that facilitates the movement of in-service transit vehicles through traffic-signal-controlled intersections. The TSP modifies the normal signal operation process to accommodate the transit vehicles to reduce the delay time of a transit vehicle at an intersection. The TSP also attempts to minimize impact on other vehicles crossing the same intersection from different directions. The traffic signal priority can improve schedule adherence, transit efficiency, and accuracy of the transit information as well as increase overall road network efficiency.

Note that traffic signal priority is different from traffic signal preemption because traffic signal preemption interrupts the normal process for special reasons (e.g., as train approaching, emergency vehicle or police car responding to an emergency call, etc.), while traffic signal priority modifies the normal signal operation process rather than interrupting it. There are generally two types of approaches to providing traffic signal priority. The basic form is local intersection TSP, which is accomplished at a local intersection level by using a first detector that detects a vehicle approaching the intersection and sending a "check-in" call to a traffic signal controller. A second detector detects the vehicle as it passes through the intersection and sends a "check-out" call to the traffic signal controller to notify the controller of this fact.

This system has several drawbacks, however. First, it requires installation of a detector and/or receiver at each TSP intersection to detect vehicles approaching the intersection. It also lacks the ability to generate detailed information related to the vehicle's speed, which relates to the vehicle's estimated time of arrival (ETA) to the intersection. These limitations may affect the accuracy of triggering the TSP request. Moreover, it is difficult to incorporate any traffic control strategy algorithm into this TSP approach because this approach does not provide the information on the many factors needed for the algorithm to calculate strategies for improving the traffic flow, minimizing the impact of traffic flow from other directions, and ensuring the safety of crossing pedestrians.

A more sophisticated approach incorporates an automated vehicle location (AVL) and control (AVLC) system that communicates with either a traffic signal controller at the intersection and/or a centralized control center in a network. The control center sends a priority request to a traffic signal at the intersection through a network connection. One common implementation of this approach requires the vehicle to transmit GPS position data periodically to the control center. The control center then calculates the speed and estimated arrival time in combination with other information to determine if TSP is needed at the intersection. If so, the control center will send a corresponding TSP request or cancellation to the traffic signal controller.

If the TSP request or cancellation is determined at the control center in a network-based TSP system, the accuracy of issuing the request is based on the frequency of the mobile unit (e.g., the vehicle) transmitting the mobile location messages to the control center. A higher frequency of reporting vehicle locations may tend to overload the radio or other components in the system, while a lower frequency of reporting may cause inaccurate timing in triggering a change in the traffic signal. The transfer rate normally is on the order of one message per second (1 Hz). However, heavy data transfer between mobile and the control center can cause radio congestion, especially for large cities with many transit vehicles operating at same time and having a high demand for TSP.

There is a desire for a method and system that can conduct traffic signal control more accurately to optimize traffic flow.

SUMMARY OF THE INVENTION

The invention is directed to a method and system that adds a traffic signal priority (TSP) subsystem using mobile event triggering function to an existing transit management system with an AVL/AVLC mobile system. Generally, the invention adds a generic mobile event triggering function into an existing mobile system. The present function includes the definition of entry of an event, evaluation criteria, and associated action related to the entry, exit, or timeout of an event. In one embodiment, the invention separates the code that implements the mobile event function from the data that actually characterizes event definitions, event criteria, event actions, etc. By separating mobile event implementation from event definition, the invention allows many different mobile events with different conditions and different actions to be created without requiring changes to any computer code.

The function includes both "entry" criteria and "exit" criteria, which dictate when a given mobile event starts and stops. For example, a simple mobile event may include a defined location and an event heading with a predefined tolerance range as its "entry" criteria. Evaluating whether a particular vehicle has caused entry of a mobile event can be conducted by the current vehicle location and vehicle heading from the automatic vehicle location subsystem. If the vehicle is within the defined location and the vehicle heading is within the tolerance range of the predefined event heading, the mobile event function will consider this occurrence an event "entry," initiating entry actions (e.g., a request for a green traffic light) and/or evaluation of other event criteria.

Similarly, the function may define the "exit" criteria as, for example, a predefined distance threshold or a predefined time threshold. If the vehicle's travel distance exceeds the distance threshold or if the predefined time threshold passes, it initiates an "exit" action, such as a traffic signal priority cancel request resetting the traffic control system into a normal operation mode.

A complex mobile event function in one embodiment of the present invention may link a sequence of mobile events into a single function; for example, an "entry" action may invoke a child event having its own associated location entry criteria, logical criteria, entry action, exit condition, exit action, etc. The embodiment of sequencing a chain of events can prohibit premature or improper invoking of a fault notification.

The invention may be implemented using a computer in the vehicle and an automatic vehicle location system (AVL). The automatic vehicle location system can use a GPS or a sophisticated mobile navigation system using the combination of GPS, inertial navigation system (INS), etc.

As a result, the invention can determine when, where, and under what conditions to invoke a proper traffic signal priority request or cancellation as well as to issue other mobile notifications (e.g., vehicle status for passenger/traveler information systems, intersection dwell time, bus stop wait time, etc.) to be issued at right location, right time, and right condition. The invention provides a reliable and accurate TSP triggering in mobile control unit without congesting radio traffic. The system and method provide better TSP implementation for both local based and network based traffic signal control systems.

BRIEF DESCRIPTION OF THE DRAWINGS

The accompanying drawings, which are incorporated in and form a part of this specification, illustrate embodiments of the invention and, together with description, serve to explain the principles of the invention.

FIG. 6A is a table illustrating one example of a main mobile event data block containing items related to event identification;

FIGS. 6B through 6E are tables illustrating examples of mobile event data blocks defining event criteria;

FIG. 6F is a table illustrating one example of a mobile event data block defining event actions;

FIG. 7 is a table illustrating sample definitions of time profiles representing a time-of-day and day-of-week;

DETAILED DESCRIPTION OF THE EMBODIMENTS

The invention is generally directed to a method and system that adds a traffic signal priority (TSP) subsystem using mobile event triggering function to an existing transit management system with an automatic vehicle location (AVL) and control (AVLC) mobile system. The automatic vehicle location system can use a GPS or a sophisticated mobile navigation system using the combination of GPS, inertial navigation system (INS), etc.

More particularly, the present invention adds a generic mobile event triggering function into the existing mobile system. The present function includes the definition of entry of an event, evaluation criteria, and associated actions related to the entry, exit, or timeout of a mobile event. The invention separates generic computer code that implements the mobile event function from data forming the actual event definitions, event criteria, event actions, etc. The separation of the implementation of the mobile event with event definition allows creating many different mobile events with different conditions and different actions without changing any computer code within the mobile system. From the mobile event definitions, functions, and detected activity at a given traffic location, the invention determines when, where, and under what conditions to generate a proper traffic signal request and/or a proper traffic signal request cancellation.

This invention can also be used for other mobile notifications to be issued at appropriate locations, times, and conditions for the information transmitted in a given notification. The mobile notification can, for example, used to output vehicle status for passenger/traveler information systems, such as street signs, or for the monitoring of a wait time at an intersection or at a bus stop.

Figure 1:
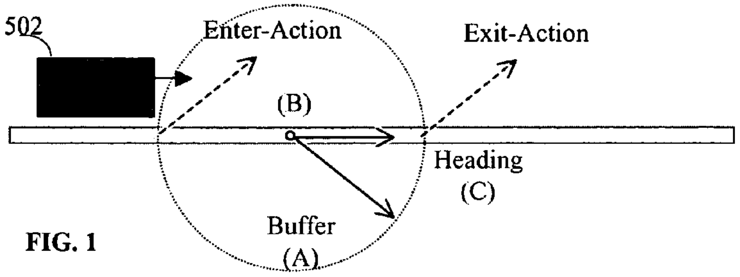
FIG. 1 illustrates a simple mobile event without any associated child events.

Turning now to the figures, FIG. 1 illustrates a simple mobile event, which involves a single event without other child events associated with it. In this example, the mobile event includes a defined location and an event heading with a predefined tolerance range as its "entry" criteria. The "entry" criteria dictate when a given mobile event has begun. Evaluating whether a particular vehicle has caused entry of a mobile event can be conducted by the current vehicle location and vehicle heading from the automatic vehicle location subsystem.

If the vehicle is within the defined location and the vehicle heading is within the tolerance range of the predefined event heading, the mobile event function will consider this occurrence an event "entry". In the example shown in FIG. 1, the event entry occurs when a vehicle 502 reaches the buffer distance (A) of the event location (B) with a proper heading range (C).

The event may then be evaluated according to a set of optional criteria upon entry of the event. The criteria could be, for example, whether the vehicle is adhering to a status or estimated arrival time with respect to a reference point (e.g., comparison of a planned bus schedule with an actual bus status). If the criteria are met, the mobile event is "fired" or "activated," initiating an action associated with the mobile event. In this example, if the bus entered the event based on the event entry evaluation and the bus is later than the predefined threshold, the mobile event function will consider the event "fired" or "activated" and may, for example, request a green traffic light. In another example, if the vehicle is adhering to its estimated arrival time, the activated event may involve sending an arriving message to a bus stop.

The mobile event may also have optional "exit" criteria associated with it, such as a predefined distance threshold or a predefined time threshold. For example, if the vehicle's travel distance exceeds the distance threshold or if the predefined time threshold passes, the vehicle movement initiates an "exit" action, such as a traffic signal priority cancel request resetting the traffic control system into a normal operation mode. The present invention also provides a safeguard in case the event exit condition cannot be met or in case the child event can not be activated within a defined time out threshold. If, for example, a timer exceeds a predefined threshold before the event exit condition is met or before the child event is activated, the event will be considered "timed out," prompting execution of an optional predefined timeout action.

Figure 2:
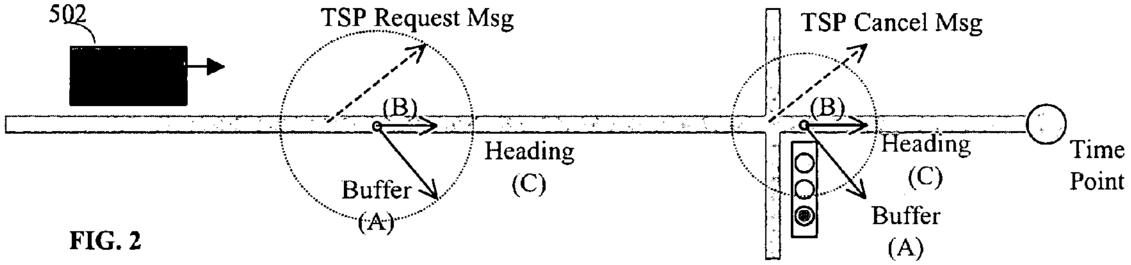
FIG. 2 illustrates the concept of using a mobile event for traffic signal priority (TSP) request and cancellation.

Many traffic events may warrant more complex sets of criteria to carry out desired traffic control results. FIG. 2 illustrates one example of a complex mobile event according to the invention, which chains a sequence of mobile event into a single event group. Generally, a complex mobile event causes an activated event to invoke an associated child event having its own location entry criteria, logical criteria, entry action, exit condition, exit action, etc. Sequencing a chain of events can limit premature or improper invoking of a fault notification.

For example, if there is a bus stop in front of a signaled intersection, a chain of events can be used to prevent a premature TSP request that may occur if the TSP request were otherwise based on a single event. Instead, the TSP request in a complex mobile event can only be invoked when previous events are qualified. In the bus stop example, these previous events may be, for example, the bus entering a given location and the bus running late, which activate child events that check the opening and closing of the bus door (indicating completion of a passenger pick up) and detect movement of the bus away from the bus stop. The TSP request is sent only after all of these previous events have been detected.

FIG. 2 illustrates one example of how to use a mobile event to trigger a TSP request using a complex mobile event. For illustrative purposes only, the example in FIG. 2 focuses on adherence to a bus schedule, but the complex mobile event can be used in any situation where a TSP request is to be based on more than one related event. In this example, when a vehicle enters a TSP triggering point as defined by the buffer and heading explained above and is late according to a predefined bus schedule, the mobile event is activated. More particularly, once the vehicle enters the triggering point, it initiates an entry-action that sends a TSP request and also activates a child event for a TSP cancel request.

When the vehicle passes through the intersection 152, this action triggers the child event, causing a TSP cancellation message to be sent to the traffic signal to complete the TSP process. The mobile event triggering method may also be designed to include a timeout feature for the child event. If the event times out and the child event has not been triggered, the timeout action will be executed. In a TSP request event, for example, a timeout action can be a TSP cancellation that cancels the TSP request. The timeout feature ensures that the vehicle can send a TSP cancellation even when the TSP cancel event is not triggered by an actual vehicle action (e.g., if the vehicle makes a detour at the intersection and misses the receiving device that normally triggers the TSP cancellation).

Figure 3:
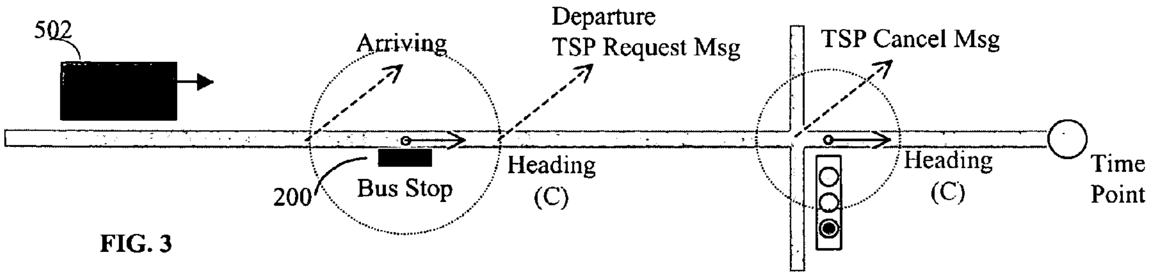
FIG. 3 illustrates using a chain of mobile events to trigger TSP when there is a bus stop in front of an intersection.

FIG. 3 is an example illustrating a case where a traffic signal is triggered if there is a bus stop 200 in front of the intersection. Because each mobile event in an event chain can have its own associated entry-action and exit-action, the TSP request can simply be defined in the exit-action to handle this situation. More particularly, the TSP event is fired when the bus arrives at the bus stop 200, but the TSP will not be sent until the bus travels certain distance and leaves the bus stop 200.

Figure 4:
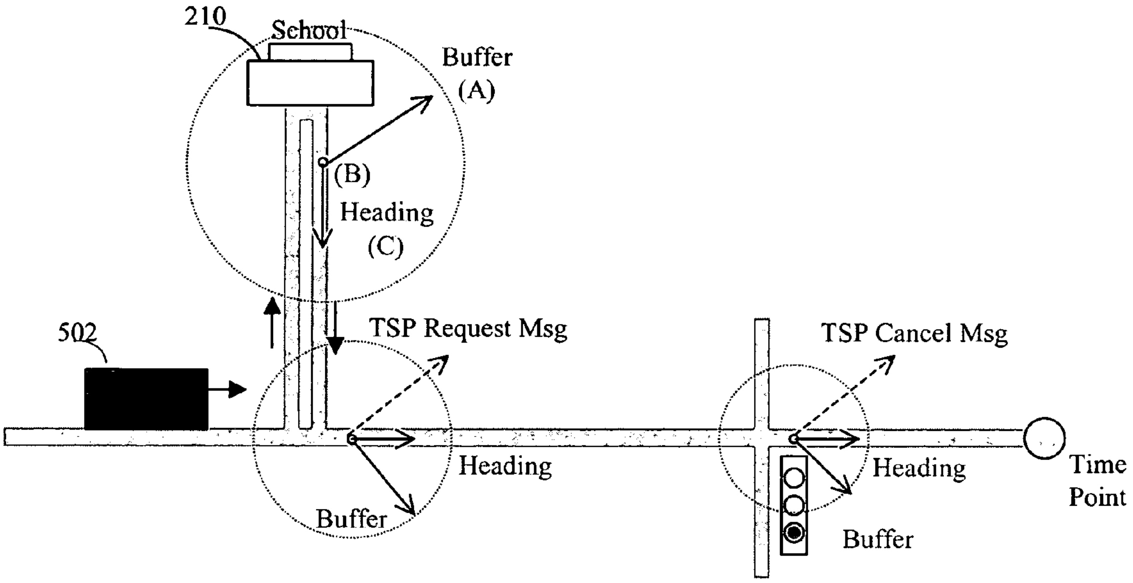
FIG. 4 illustrates a complex mobile event incorporating a chain of child events.

FIG. 4 illustrates an example of how to create a mobile event to avoid triggering a TSP request prematurely. In this example, another event may be included in the event chain to avoid invoking a TSP request before the vehicle reaches a school 210 and require the vehicle to pass the school 210 to activate the TSP mobile event. Because of the entry heading, the mobile event will not be fired before the vehicle leaves the school 210. The TSP request can therefore only be activated when the first event (i.e., the vehicle passing the school) is activated.

Figure 5:
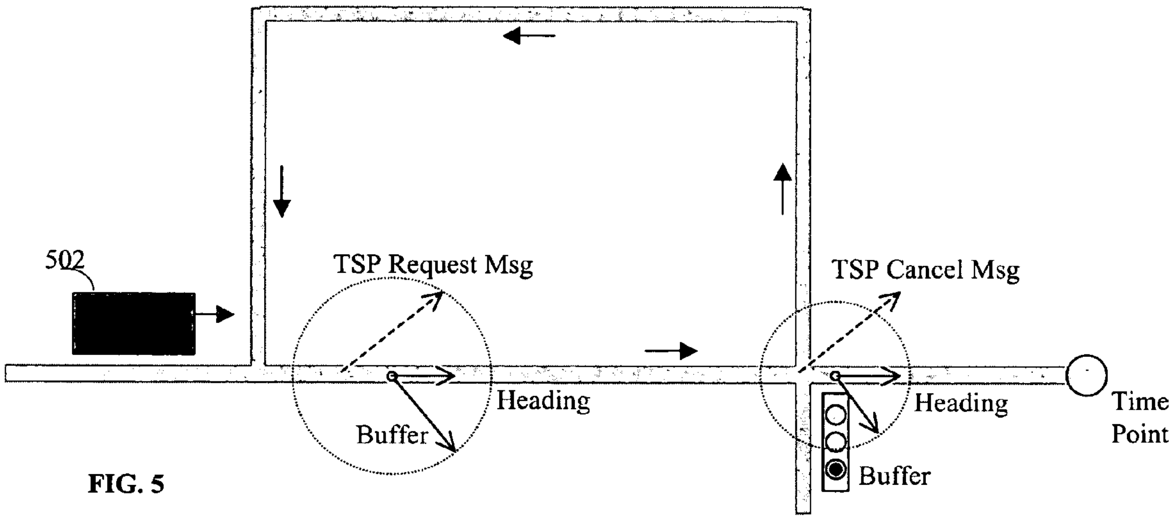
FIG. 5 illustrates an example where a mobile event can be activated repeatedly.

The invention also allows a mobile event to be triggered repeatedly, as shown in FIG. 5. In the illustrated example, a bus makes a detour and loops back to the same intersection. The traffic signal priority will still work properly as long as all associated mobile event criteria are met.

Mobile events that trigger a TSP request or cancellation can be defined by the inventive system according to various definitions. As previously noted, triggering of a given mobile event action is kept separate from the data that actually defines the mobile event. In other words, the actions described above with respect to FIGS. 1 through 5 are separate from the data defining the mobile events themselves. As a result, the specific characteristics of the mobile events can be defined and modified without changing any of the software that actually implements the actions based on the mobile events.

A mobile event definition can include the geographic location of the event, event triggering criteria, corresponding event actions, and associated child events if there are any. In one embodiment, mobile event definition data items may be divided into four categories: identification data, criteria data, action data, and associated child events. For illustrative purposes only, Table 1 below lists possible definitions of various mobile event items in one embodiment of the invention.

TABLE 1

| Mobile Event Data Field | Description |
|---|---|
| Event | Event identifier. Value is sent in the eventID field in a mobile event message when applicable.<br>the mobile event message is sent only when information needs to be conveyed to the control center, for example, for the networked configuration of the TSP or the notification of street signs. |
| Group | To group a sequence of events into one group |
| Sequence | Value that indicates the order of the events in a group. Sequence = 1 is a root sequence number and is always evaluated first. A sequence 2 record is only evaluated if the immediately preceding sequence 1 event and all sequence 1 criteria are met. A sequence 3 record is only evaluated if the immediately preceding sequence 2 event and all sequence 2 criteria are met. There can be sequences 4, 5, and so forth.. A child event is determined if the event monitoring task detects a subsequent sequential record (e.g., a sequence 2 record that follows a sequence 1 record) and Next Flag is set to 1 (enabled). |

TABLE 1-continued

| Mobile Event Data Field | Description |
|---|---|
| Time Profile | This value is used to match the value for the time profile data block if the value is invalid, the event will be applicable for any time. |
| Enable Flag | Set to none-zero to enable the event. If set to 0, record is disabled. |
| Type | Value that identifies the type of event. Values can be:<br>1 - STREET_SIGN<br>2 - TRAFFIC_SIGNAL<br>3 - BUS_STOP<br>4 - INTERSECTION<br>Value is sent in the eventType field in the mobile event message when applicable. |
| Attribute | Any attributes that may be associated with the event. For instance, in TSP event, the attribute is the traffic signal Id, which can be used to retrieval the TSP network address, etc. |
| Location Criterion Flag | If set to none zero, location criterion is checked using the latitude, longitude, distance, heading, and heading deviation. Set to 0 if no location checking is desired. |
| Latitude | A long integer value representing the point's latitude |
| Longitude | A long integer value representing the point's longitude |
| Buffer Distance (Entry) | Radius, in feet, around the point located by the latitude and longitude values. |
| Approaching Heading | An integer number of degrees, from 0 to 359, describing the direction that the vehicle should be heading. For example:<br>0 - North<br>90 - East<br>180 - South<br>270 - West |
| Heading Deviation | An integer specifying the number of degrees the vehicle's heading can vary to either side of the specified bearing. Specifying a deviation >= 180 degrees creates a "don't care" condition for heading, although the vehicle still needs to be moving. |
| Adherence Criterion Flag | Set to none zero to enable the schedule adherence related checks. Set to 0 to disable the check. |
| Timepoint | an ID to indicate which timepoint will be used for the adherence check. The timepoint instance is the next time a vehicle encounters a timepoint with the specified ID. |
| Adherence Threshold | Adherence limit. Positive adherence is early and negative adherence is late. |
| Adherence Operator | Either '<' or '>'.<br>If < (less than), the current adherence to the specified timepoint must be less than the adherence threshold value for this test to pass.<br>If > (greater than), the adherence must be greater than the adherence threshold value for this test to pass.<br>If set to any other value, the test will consider false. |
| Criteria Combination Operator | Either '&' or '\|'.<br>If &, this criterion and ALL other criteria must pass to constitute a pass condition.<br>If \|, any of the selected tests can pass to constitute a pass condition. |
| Action Code | The action to be performed upon the above tests passing. |
| Exit Distance | The number of feet the vehicle must from the entry of the event to exit this event. |
| Exit Time | The number of seconds after the vehicle enters the event. it is forced to exit the event. |
| Exit Action Code | The action to be performed upon exiting an event. Either the exit distance or exit time test will cause the vehicle to exit the event. |
| Has Next Event Flag | If set to 1, the following record is a child event. (The sequence number incremented by one within the same group is the next child event. If set to 0, no more child event. |
| Timer to Next Event | The number of seconds between the entry time. if the timer runs out and this event is not exit and next event is not started, the this event is considered as timeout |
| Timeout Action Code | The action to perform the event timeout. |

Other items and characteristics may also be included in the mobile event definition without departing from the scope of the invention. The Figures and the detailed description will describe other possible fields that may be used in the invention.

FIGS. 6A through 6E illustrate examples of mobile event definition data blocks of various types. As can be seen in the Figures, a given mobile event definition may have any number and combination of fields, providing a large amount of flexibility in event definition.

FIG. 6A illustrates an example of a main mobile event data block. The Event ID 300 is a key that uniquely identifies an event. The Event ID 300 can be used to associate different event definition data blocks with the same Event ID 300. The Event Group ID 302 and the Event Sequence ID 304 are used to group a sequence of events; the Event Group ID 304 identifies a particular group, while the Event Sequence ID 304 identifies the order of which event will be active within the group.

A Route ID 306 and a Route Direction ID 308 may be included in the mobile event if the event is applicable for fixed route buses having predefined routes. The Route ID 306 and Direction ID 308 are used to identify a specific route in this example; however, other route identification information can also be used if desired. If a valid Route ID 306 and Route Direction ID 308 are given in the mobile event definition, that event will only be valid for the given route and direction when the bus driver has logged into the system to run a vehicle in the given route and direction. If the Route ID 306 and the Direction ID 308 are null, the event is applicable to any vehicle that entering into the location defined in the mobile event.

A Time Profile ID 310 can be used to define a particular time period in which the event is applicable. A detailed example of a Time Profile definition is shown in FIG. 7. The service day 310*a* can be used to represent a day-of-week. Actually, the service day can be more flexible to indicate applicable days, for instance, it can be weekday, Saturday, school days, holidays, etc. In combination with applicable days, the start times 310*b* end times 310*c* specify the specific time window in which a given event is applicable. The descriptions 310*d* provides a readable reference to the specific time window. If there is no time profile associated with a given mobile event, then that event can be activated at any time, with no time restrictions.

The mobile event can be marked "enable" by defining a non-zero value in an Enable Event field 312. If a particular mobile event is marked as zero in the Enable Event field 312, that event is turned off and will not be used in the mobile system. If the invention is used in a mobile system with radio communication capability, the Enable Event 312 field can be easily turned on or off by a message from control center to the mobile unit.

An Event Type ID 314 defines the type of event defined by the mobile event definition. In this example, Event Type ID "2" 314 indicates that the defined mobile event is a traffic signal priority (TSP) event. Other types of events may include, for example, a street sign, a bus stop, or an intersection. The Event Attribute ID 316 can be used in conjunction with the Event Type ID 314 to look up associated event information. In this example, the Event Attribute ID "1" and "6" represent traffic signal IDs, which can be used to retrieve the information associated to their corresponding traffic signals.

As shown in FIG. 6A, the mobile event data block may also define associated child events if a given mobile event is part of a more complex event. If the "Has Next Event" field 318 is non-zero, the next event in the data block having the same Event Group ID 302 and an immediately subsequent Event Seq ID 304 is the next mobile event to be activated. A given main event can have an associated Timer To Next Event field 320, which indicates a time limit for the associated child event to be activated. If the timer expires without activation of the associated child event, the main event will conduct a timeout action defined in a Timeout Action ID 322.

FIGS. 6B, 6C, 6D, and 6E are examples of mobile event data blocks defining various event criteria. The event definition data block shown in FIG. 6B, is an example of location criteria for selected mobile events. In this example, the Event ID 300 associates the location criteria with a particular mobile event; in other words, the Event ID 300 ensure that different definitions associated with the same mobile event are easily identifiable. A Use Location Criterion field 324 indicates whether or not a given location criterion will be used for its associated mobile event. If a vehicle's location is within a defined Buffer Distance 330 of the location, as defined by a Latitude 326 and Longitude 328, and the vehicle heading is within the defined Approaching Heading 332 within plus or minus (+/−) of the Heading Deviation 334, the location criterion is considered true. The Criteria Combination field 336 is used indicate that the given location criterion with other criteria of the same mobile event. If the value of the column is "&" (AND), this criterion and all other enabled criteria associated with the same mobile event have to be true in order to activate the mobile event.

FIG. 6C is an example of adherence criteria for various selected mobile events with respect to time thresholds. The adherence criterion is used to limit issuance of traffic signal priority only when a vehicle adheres to various thresholds. In this example, the adherence criteria are applied only when a vehicle is running later than a defined time threshold. In row 2 of FIG. 6C, for example, the Event ID 300 is 1 and the Timepoint Adherence Threshold 342 at a specified Time Point 340 is defined as 5 minutes, where a negative value represents a threshold that is later than a scheduled time-point. The Adherence Operator 344 indicates the conditions in which the adherence criterion is considered true; in row 2 of FIG. 6C, for example, the symbol "<" indicates that the criterion is to be considered true if the current actual schedule adherence is less than −5 (i.e., if the vehicle is running late by 5 minutes or more).

FIG. 6D illustrates another example of adherence criteria, this criterion is based on passenger load thresholds. In this example, the use adherence threshold is based on a passenger count 342*a*, which ensures that traffic signal priority is issued only when the number of onboard passengers are above a predefined threshold. More particularly, there must be 25 or more passengers on board in this example to qualify the criterion shown in row 2 of FIG. 6D.

Like the previous example, the Use Passenger Counter Criterion field 338*a* indicates whether a particular event even has an associated passenger event criterion. The Adherence Operator field 344 and the Criteria Combination field 346 are the same as in the previous example. The Use Passenger Count 347 field can be set based on whether or not the passenger count criteria is being used for that event; if, for example, an operator wishes to disable the passenger count criterion for a given event, he or she may enter a non-zero value in the Use Passenger Count 347 field.

A given mobile event may include both adherence and passenger count criteria. In the illustrated example, for the event corresponding to row 2 in the data blocks, a TSP request would be issued only if the vehicle is late by 5 minutes or more and if the number of passengers on board the vehicle is 25 or more.

FIG. 6E illustrates an example of a data block that defines a vehicle status criterion for various mobile events. For example, in row 5 of FIG. 6E, the Event ID 300 is 17, linking the criterion with other criteria having Event ID 17. A non-zero value in the Use Vehicle Status Criterion 348 indicates that the criterion is to be used. A Status Type 350 indicates the vehicle part status to be evaluated (a door in this example), while the Status field 352 indicates the specific status used in the criterion to determine whether it is true or false. For Event ID 17, the criterion is deemed true by the Condition field 354 if the vehicle door status 352 is open. The Criteria Combination field 346 acts in the manner explained above and indicates that the criterion is one of several criteria to be fulfilled before activation of the mobile event.

If a desired combination of selected criteria is satisfied as defined in the event data blocks, the mobile event associated with those criteria is considered "activated." The activated mobile event will then conduct a series of actions in response to the fulfilled criteria, an example of which is shown in FIG. 6F. In row 2 of FIG. 6F, the Event ID 300 is 1, and an Action ID 356 is 13, which represents the action of invoking a traffic signal priority request in this example. Other Action IDs may be assigned to various actions and stored in a look-up table. The event definition data block also includes event exit behaviors. In row 2 in FIG. 6F, for example, the event is considered as "exited" when the vehicle has traveled 500 ft as defined in an Exit Distance field 358 or after 50 seconds has passed as defined in an Exit After Time field 360, whichever comes first. The Exit Action 362 is 14 which represents the action of invoking a TSP cancel request in this example.

Figure 8:
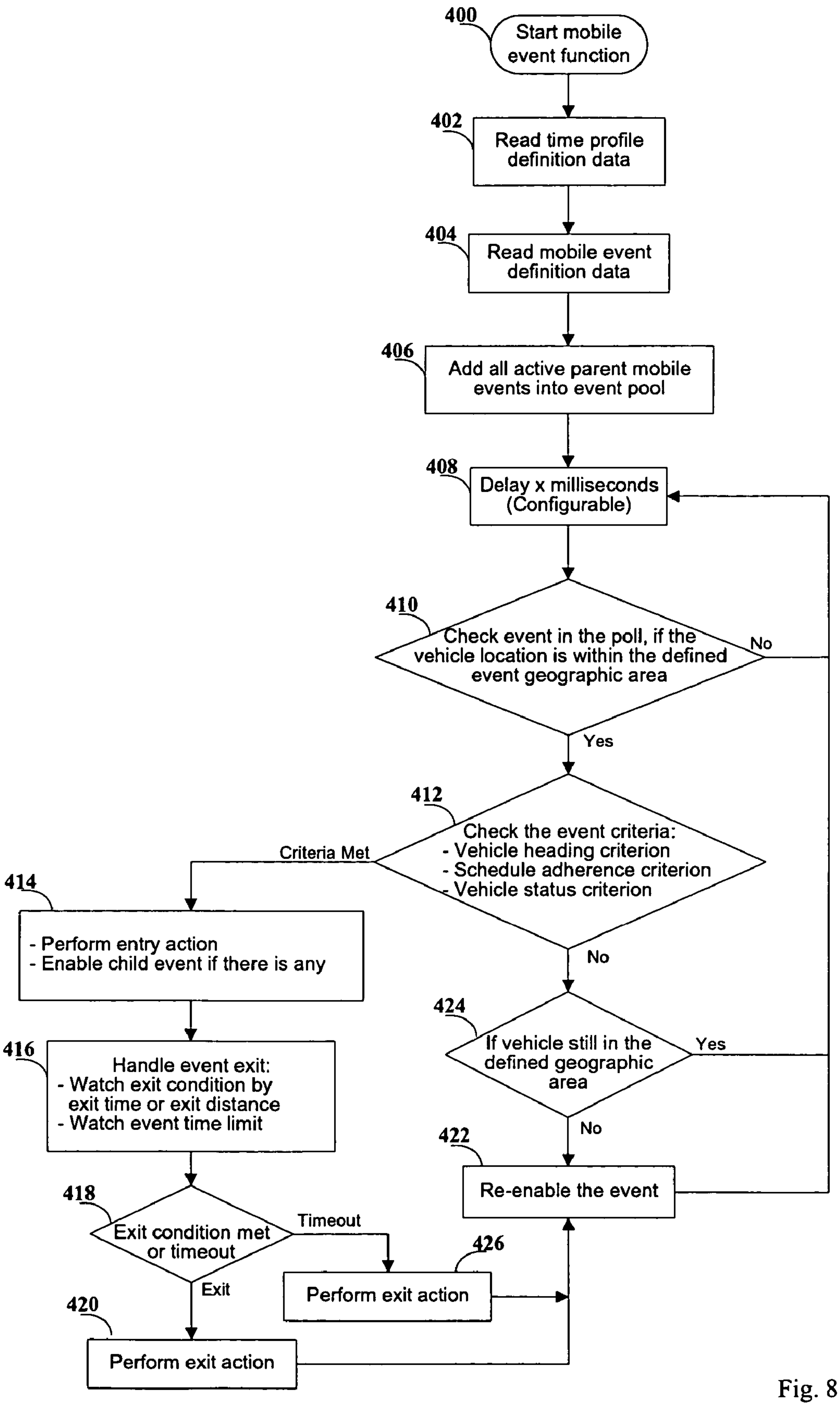
FIG. 8 is a flowchart depicting the mobile event functions performing in a mobile computer unit according to one embodiment of the invention.

FIG. 8 is a flowchart illustrating one example of basic mobile event functions performed in a mobile computer with an automatic vehicle location and control system. It will be understood that, although the flowchart of FIG. 8 implies a sequence of operations, some of the described functions may be performed on a continuous basis in parallel with other functions.

When the mobile computer is powered up successfully, the mobile event function starts (block 400). The mobile event function reads the time profile definition data (block 402), which contains a list of defined time profiles as explained above. In one example, the time profile may be defined by a range of time-of-day and day-of-week definitions. The day-of-week definition can be defined as a service day, which provides a flexible way to group multiple days of the week in the definition. The time profile definition dictates the behavior of the mobile events by limiting applicability of the mobile event only during the time-of-day and the day-of-week. Of course, if there is no time profile definition associated with the mobile event, the event is applicable at any time.

The mobile event function also reads the mobile event definition data blocks (block 404), which defines the geographic area for activating the mobile event. The event definition data may also include any or all of the following: a list of criteria for vehicle locations and headings, schedule adherence, and vehicle status conditions; event action when the event criteria are met; event exit conditions and event exit action.

All parent mobile events, with the smallest event Seq ID in field 304 of each event group in field 302, are added into an event pool (block 406). In the example shown in FIG. 6A, the events in row 2 and row 4 will be added into the event pool. All the criteria with the event ID 1 and event ID 16 in the field 300 will be added to the pool for the evaluation. At this point, the mobile event function watches every event in the pool to evaluate if the vehicle has moved into the defined geographic area (block 410). The frequency at which the mobile computer evaluates the event condition is based on a configurable delay time (block 408).

If a detected mobile event is in the defined geographic area and if the combination of the criteria of vehicle's heading, schedule adherence threshold, and vehicle status conditions are met (block 412), the mobile event is considered activated and will therefore perform an event entry action and enable a child event, if any (block 414). For example, when the mobile even is activated, the event action can be a notification of traffic signal priority request. If the event criteria are not met (block 412) and the vehicle is still in the defined geographic area (block 424), the mobile event function will continue to watch the event status.

An activated event also implements functions to handle an event exit, which includes evaluating exit conditions that indicate that the vehicle has moved beyond a defined distance from the entry of the event or has passed a defined time period from the event entry (block 416). The exit handling function also watches if the entry event times out before the event exit condition is met (block 418). If the event exit condition is met (block 416), the mobile event function will perform the exit action (block 420) and then re-enables the event (block 422). If the event times out (block 418), the event function will perform a timeout action if there is any (block 426) and then re-enable the event (block 422) to return the event back into the event pool.

Figures 9, 10:
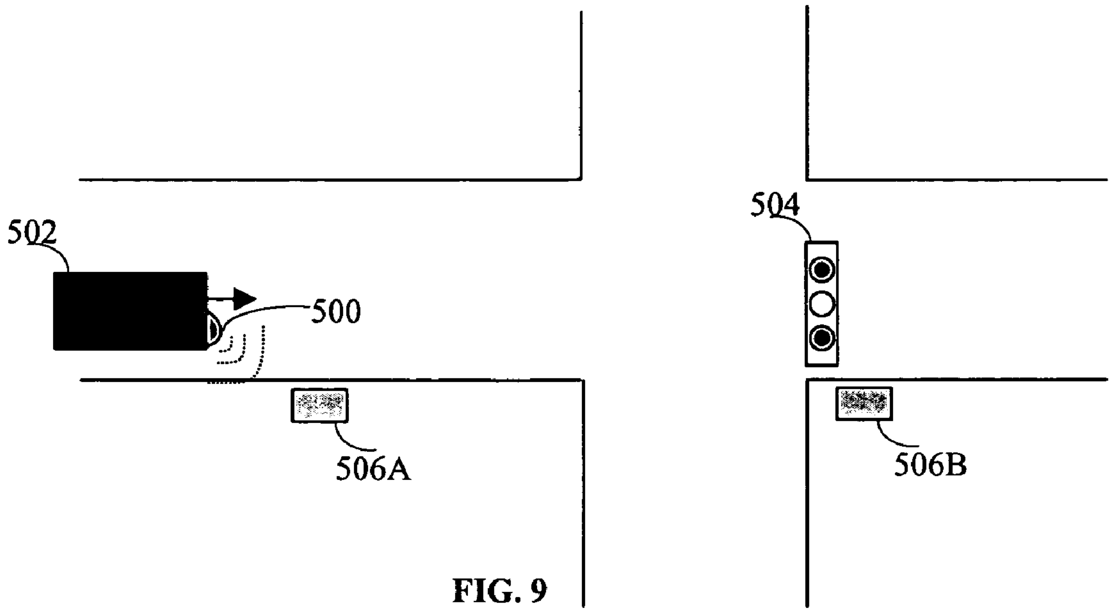
FIG. 9 is a representative diagram of a local-based traffic signal priority system.
FIG. 10 is a table illustrating sample definitions of TSP emitter state settings for a local-based traffic signal priority system.

The invention can be implemented in both local-based and network-based traffic signal priority or traffic signal preemption systems. If the invention is implemented in a local-based traffic signal priority system, as represented in FIG. 9, the system may include the inventive mobile event functions in this invention and a commercially-available signal control emitter 500 mounted on the vehicle 502. The mobile event function evaluates the predefined sequence of mobile events to turn on the emitters 500 to a proper level of priority and a proper discrete vehicle code if applicable. The mobile event function also provides the input to turn off the emitters 500 as part of mobile event chain as described above.

To ensure that the traffic signals 504 respond to the vehicle movement and position in a timely fashion, the vehicle-mounted emitters 500 should be set to a TSP request state when or before the vehicle passes a given street-mounted TSP receiver 506A, ensuring that the receiver 506A picks up the request and responds to the request (e.g., changes the traffic signal) before vehicle arrives at the traffic signal 504. Similarly, the vehicle-mount emitter 500 should be mounted so that it can be set to a TSP cancel state in response to a TSP cancel request when or before the vehicle 502 passes the second TSP receiver 506B normally mounted on the street side after crossing the traffic signal 504.

When the mobile event conditions are met and the event action is to request TSP for a local based traffic signal priority system, the mobile computer system may set the state of vehicle-mounted emitter to values shown in FIG. 10. The different action codes in the mobile event can be related to the definition of the event criterion comparing the schedule adherence status. For instance, if the bus is 5 minutes late, the mobile event function may select the lowest TSP request; the bus if 10 minutes late, the mobile event function may select a medium TSP request, and so on.

Figure 11:
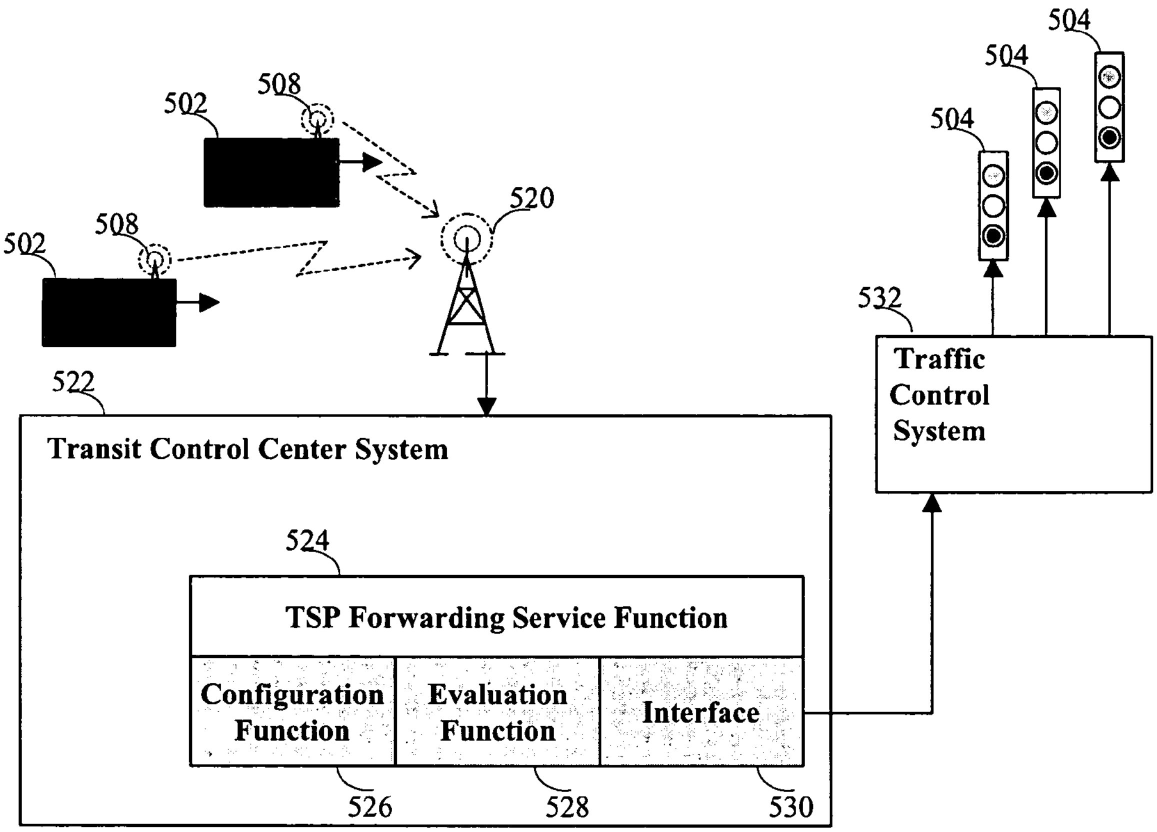
FIG. 11 is a representative diagram of a network-based traffic signal priority.

If the invention is implemented in a network-based traffic signal priority system, as represented in FIG. 11, the system may incorporate the mobile event functions described into a mobile computer system with an onboard radio communication module 508. The radio 508 can send messages to a fixed-site computer system having a central transit control center system 522 via a radio communication tower 520. In this case, the computer system acts as the signal receiving device as digital data is sent and received between the radio communication module 508 and the computer system. With this commercial available radio communication infrastructure, the mobile event function can send a TSP request or TSP cancellation with the right timing, right place and right condition as described in the mobile event to the transit control center 522. The additional embodiment of the invention will evaluate the TSP message and decide whether the TSP request should be issued and how it is to be issued to the commercial available traffic signal control system 532. The traffic control system controls the operation of individual traffic signals.

In a network-based system, the onboard radio 508 on the vehicle 502 transmits the TSP request message to the transit control center 522. More particularly, once a mobile event evaluates TSP events of an approaching vehicle in the network-based TSP system, the mobile computer will send a message via a mobile communication module 508 to the transit control center 522 if the mobile event triggers a TSP request. Note that at this point, the traffic signal control system 532 itself does not receive any TSP request yet to a given traffic signal; instead, the TSP request message from the vehicle is first evaluated by the transit control center 522 system.

When the invention is used in a network-based system, the message in the TSP request should include at least the following items: vehicle ID, event ID, event action ID, event urgency level, bus route ID if the vehicle is a fixed route bus. When the transit control system 522 receives and decodes a message from a vehicle 502, the system can resolve the traffic signal ID by looking up the event type and event attribute ID based on the event ID in a table. From the traffic signal ID, the transit control system 522 can look up a signal network address, signal control card ID that indicates a card that controls the specific signal, and a specific port for the TSP request or a specific port for the TSP cancellation as specified by the traffic control system. Before invoking the TSP request through the network to the traffic signal control system 532, the system checks the following: whether the vehicle is authorized to use the TSP; whether the requested signal's TSP function is enabled; whether there is no other TSP request for the same intersection within the defined signal cycling time period; whether there is available TSP quota for the intersection during the defined time profile. If all the above verifications are satisfied, the transit control system 522 will forward the TSP request to the traffic signal control 532 to control the traffic signal 504.

The transit control center 522 system includes a TSP message forwarding service 524 function, which constitutes an additional embodiment of this invention. The message forwarding service function 524 can take a TSP request or cancellation originating from a given vehicle and forward it through the network.

The TSP message forwarding service function 524 in the transit control center 522 may include a configuration function 526, an evaluation function 528, and an interface 530 to the traffic signal control system 532 in the network. The configuration function 526 allows transit managers to enable or disable TSP requests for either a specific intersection or a selected group of intersections. It also provides the capability of granting TSP rights to allow only the selected vehicles to use the TSP function. The selection can be made by selecting a specific vehicle, a group of vehicles, or a specific type or types of vehicles. If the TSP is disabled for a given intersection or a vehicle, a TSP request for that intersection signal from that vehicle will not be forwarded to any traffic signal controller 532 from the TSP forwarding service function 524. This configuration function offers flexibility in TSP management by providing a centralized location for changing the TSP configurations of multiple vehicles and traffic signal locations without resorting to radio communication. Further, the configuration function safeguards against intrusion of unauthorized TSP users by moving TSP control to a central transit control center system location and limiting access to that location; as a result, a TSP request from an unauthorized source will not be forwarded to the traffic signal control.

The evaluation function 528 in the TSP message forwarding service resides in the transit control center system 522 and provides TSP implementation strategies to manage TSP requests and information from multiple vehicles 502. For example, if multiple transit vehicles request a TSP for the same intersection, the evaluation function 528 in the TSP message forwarding service will make a choice and only forward one TSP request to the traffic signal control system 532. This function also controls the quota of how many TSP requests can be issued for a given signal within a predefined time window. Using TSP implementation strategies in the transit control center system minimizes the possibility that traffic signal priority will be overused. In addition, the evaluation function 528 may writs the traffic signal priority request and cancellation history into a computer data storage device to generate a historical summary report.

The TSP message forwarding service also includes an interface 530 between the transit control center and the traffic control system controlling operation of the traffic signals. This interface sends a TSP request or TSP cancellation based on the standards or specifications of the traffic control system 532, thereby granting TSP rights. The TSP rights can, for example, be granted for a specific vehicle, a group of vehicles, a select type or types of vehicles, and/or vehicles on a given bus route or routes for a specific traffic signal or a group of traffic signals on the specific time-of-day and day-of-week. Other customized traffic control patterns and authorizations can be selected without departing from the scope of the invention.

Note that a given vehicle may incorporate capabilities that function in both a local-based system and a network-based system, enhancing the versatility of that vehicle with respect to traffic signal priority.

The invention provides a reliable and accurate TSP triggering in mobile control unit without congesting radio traffic. The system and method provide better TSP implementation for both local based and network based traffic signal control systems. In addition, the same event triggering function can be used for other mobile notification applications.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A mobile computer for use in a traffic signal priority control system, comprising:

a storage device containing at least one event defnition data block, wherein said at least one event definition data block contains mobile event criteria defining at least one mobile event, wherein the mobile event criteria defines a parent event and at least one child event depending on the parent event; and a processor containing an algorithm that evaluates a vehicle status with respect to the mobile event criteria and activates the mobile event if the mobile event criteria are met, wherein the processor evaluates the vehicle status with respect to a sequence of mobile events containing a parent event and at least one child event, and wherein the processor activates the mobile event if the mobile event criteria for the parent event and said at least one child event are met.

* * * * *